(12) United States Patent
Harazi

(10) Patent No.: US 12,245,683 B2
(45) Date of Patent: Mar. 11, 2025

(54) BRUSHING ACCESSORY

(71) Applicant: Itzhak Harazi, Petah-Tikva (IL)

(72) Inventor: Itzhak Harazi, Petah-Tikva (IL)

( * ) Notice: Subject to any disclaimer, the term of this patent is extended or adjusted under 35 U.S.C. 154(b) by 346 days.

(21) Appl. No.: 18/078,959

(22) Filed: Dec. 11, 2022

(65) Prior Publication Data

US 2023/0107686 A1 Apr. 6, 2023

Related U.S. Application Data

(63) Continuation-in-part of application No. 17/105,546, filed on Nov. 26, 2020, now abandoned.

(30) Foreign Application Priority Data

Dec. 12, 2019 (IL) .......................................... 271424

(51) Int. Cl.
| | |
|---|---|
| *A46B 13/02* | (2006.01) |
| *A46B 5/00* | (2006.01) |
| *A46B 13/00* | (2006.01) |
| *A47K 7/04* | (2006.01) |
| *A61C 17/26* | (2006.01) |
| *A61C 17/40* | (2006.01) |

(52) U.S. Cl.
CPC ............ *A46B 13/02* (2013.01); *A46B 5/0058* (2013.01); *A46B 13/008* (2013.01); *A47K 7/04* (2013.01); *A61C 17/26* (2013.01); *A46B 2200/1006* (2013.01); *A61C 17/40* (2013.01)

(58) Field of Classification Search
CPC .................. A46B 13/02; A46B 13/008; A46B 2200/1006; A46B 2200/102; A46B 2200/1033; A47K 7/04; A61C 17/26; A61C 17/3409; A61C 17/3427; A61C 17/3436; A61C 17/3472; A61C 17/40
See application file for complete search history.

(56) References Cited

U.S. PATENT DOCUMENTS

2021/0274925 A1\* 9/2021 Langberg ............. A46B 13/008

FOREIGN PATENT DOCUMENTS

WO WO-2015086334 A1 \* 6/2015 ............. A45D 34/04

\* cited by examiner

*Primary Examiner* — Randall E Chin
(74) *Attorney, Agent, or Firm* — AlphaPatent Associates Ltd.; Daniel J. Swirsky

(57) ABSTRACT

A brushing accessory, including a first member, including a hole and a brush fixed thereto, and a second member, including a motor for rotating a first elliptic gear, a second elliptic gear interlaced with the first elliptic gear, and a pin extending from the second elliptic gear into the hole of the first member, thereby moving the brush on a user's body as a function of changing locations of the pin, the locations changing as a function of the interlacing of the elliptic gears.

3 Claims, 10 Drawing Sheets

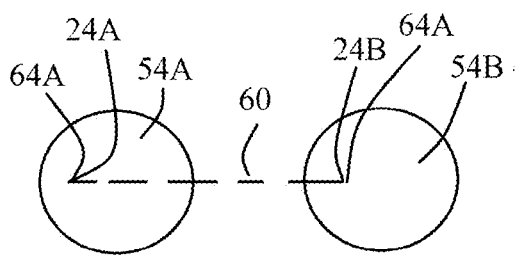
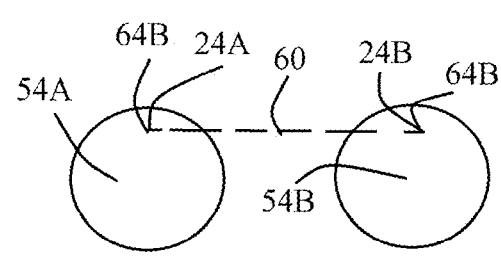
FIG 4  FIG 5
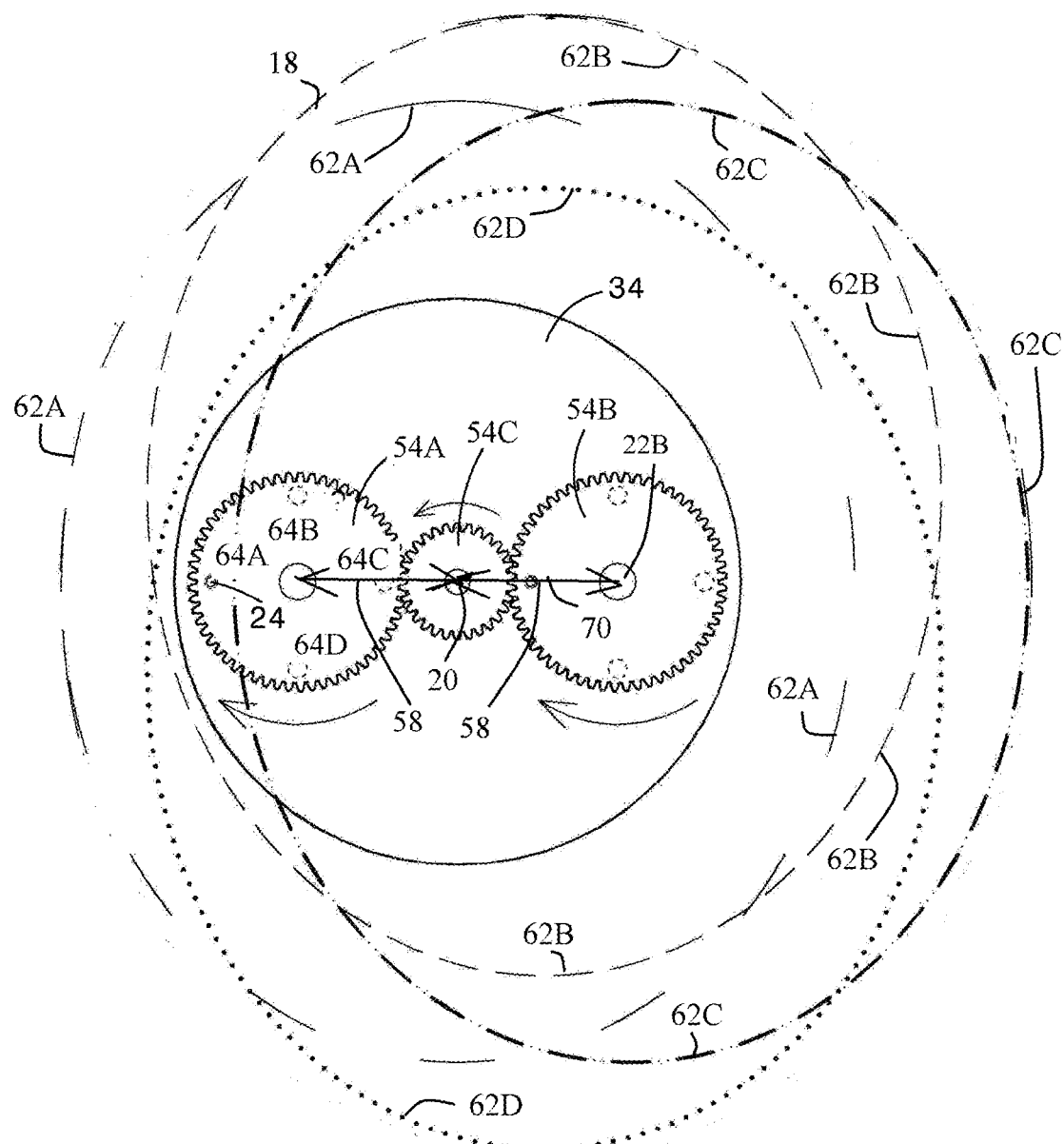
FIG 6

BRUSHING ACCESSORY

TECHNICAL FIELD

The invention relates to the field of body soaping and brushing.

BACKGROUND

Many people rub their backs by others, or by a strap which may, for example, from a sponge affixed to cloth, by a long-handled brush, etc.

However, motorized brushing is not comfortable to the body.

There is a long felt need to provide a solution to the above-mentioned and other problems of the prior art.

SUMMARY

A brushing accessory, including:
a brush; and
a motor including interlaced gears,
thereby moving the brush back and forth.

BRIEF DESCRIPTION OF THE DRAWINGS

Embodiments, features, and aspects of the invention are described herein in conjunction with the following drawings:

FIG. 4 is a top view of the opposing gears at the state of FIG. 3.

FIG. 5 is the top view of the opposing gears upon rotating 90 degrees.

FIG. 6 depicts 4 locations of one of the pins of FIG. 2, and the disposition of the brush member for each of the dispositions.

The drawings are not necessarily drawn to scale.

DETAILED DESCRIPTION

The invention will be understood from the following detailed description of embodiments of the invention, which are meant to be descriptive and not limiting. For the sake of brevity, some well-known features are not described in detail.

The reference numbers have been used to point out elements in the embodiments described and illustrated herein, in order to facilitate the understanding of the invention. They are meant to be merely illustrative, and not limiting. Also, the foregoing embodiments of the invention have been described and illustrated in conjunction with systems and methods thereof, which are meant to be merely illustrative, and not limiting.

Figure 1:
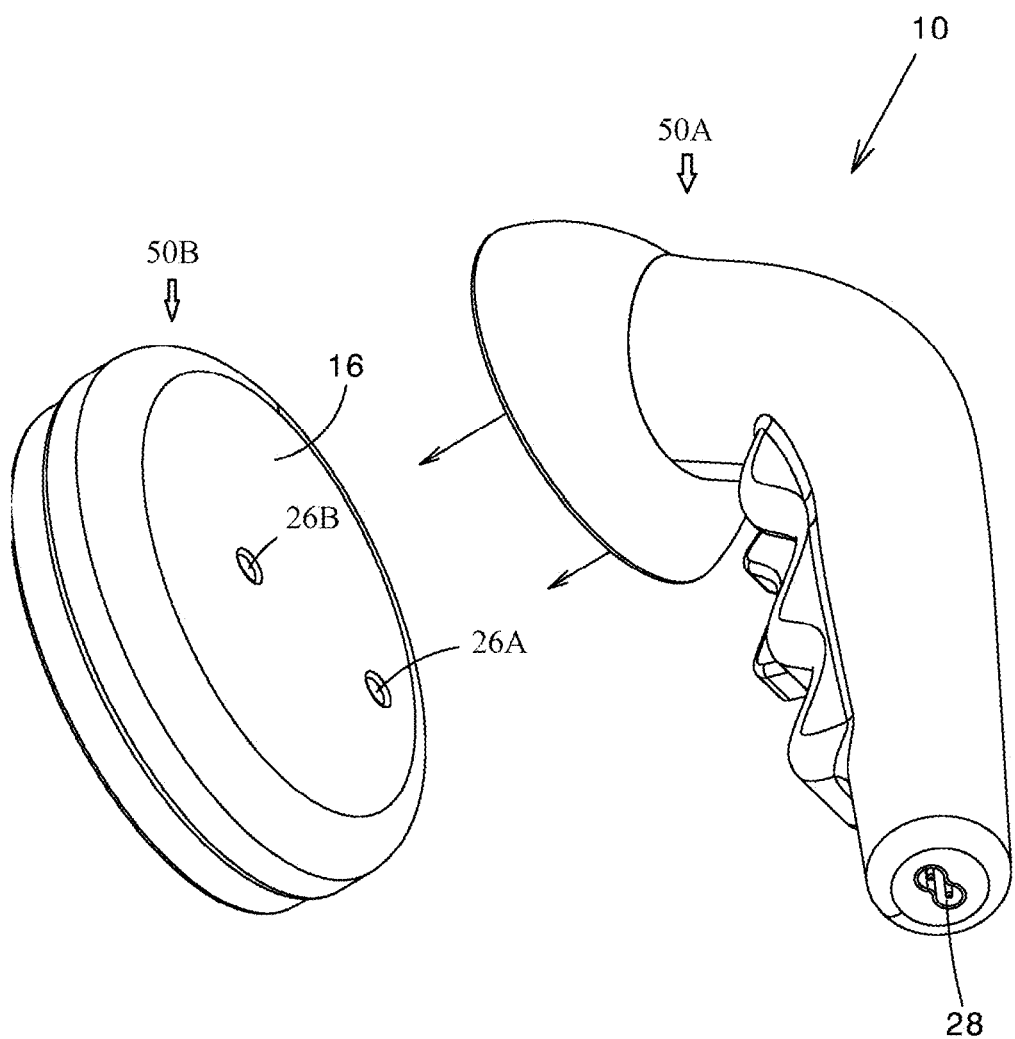
FIG. 1 is in an exploded perspective view of a brushing accessory according to one embodiment of the invention.

FIG. 1 is in an exploded perspective view of a brushing accessory according to one embodiment of the invention.

A brushing accessory 10 such as for soaping, according to one embodiment of the invention, includes a motorized member 50A and a brushing member 50B, including holes 26A and 26B at a first side and a brush 18 at its second side.

Figure 2:
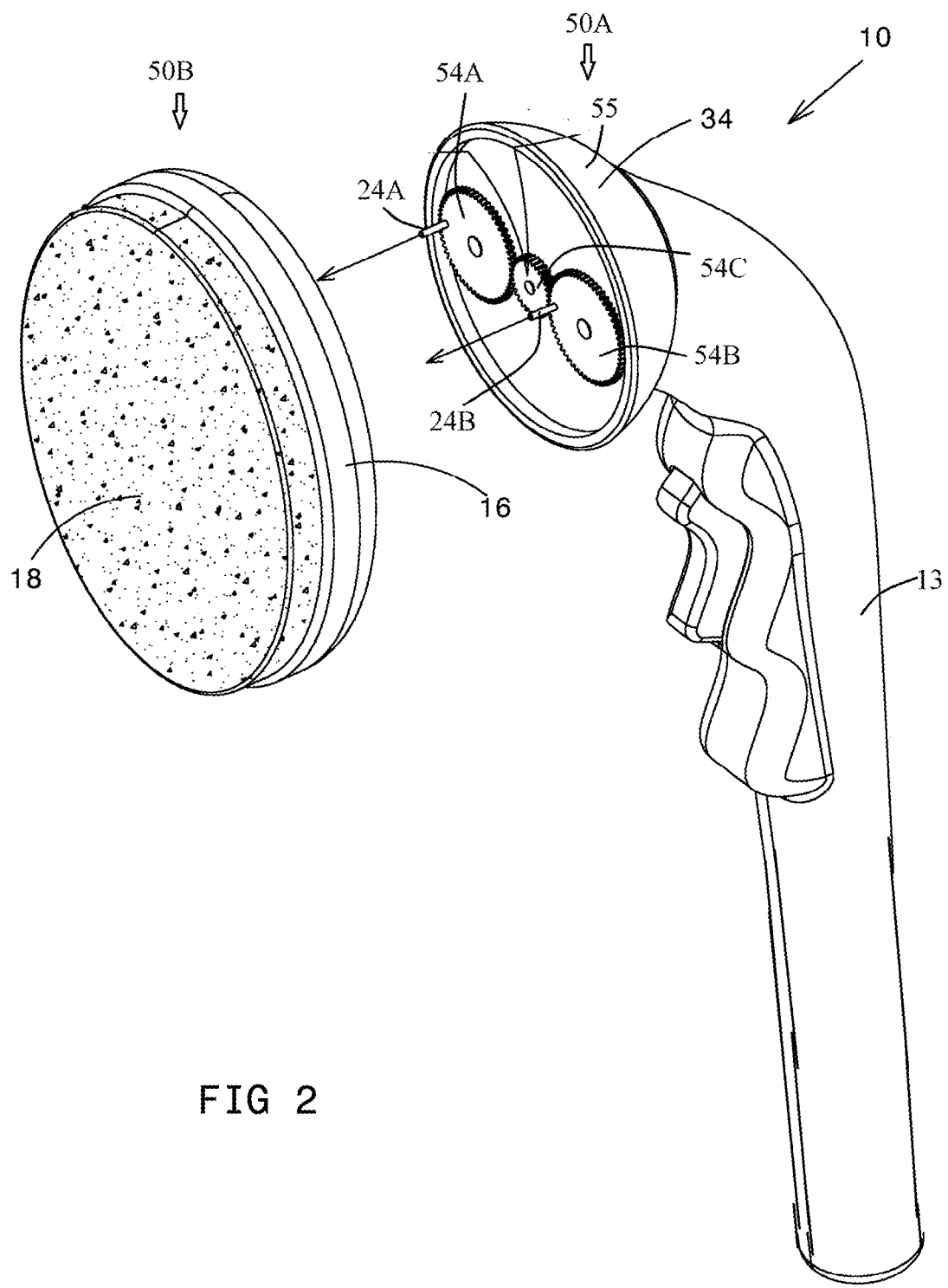
FIG. 2 is the exploded perspective view of FIG. 1 from another angle of view.

FIG. 2 is the exploded perspective view of FIG. 1 from another angle of view.

Connecting motorized member 50A to brushing member 50B inserts pin 24A of motorized member 50A into hole 26A and pin 24B into hole 26B of brushing member 50B.

Figure 3:
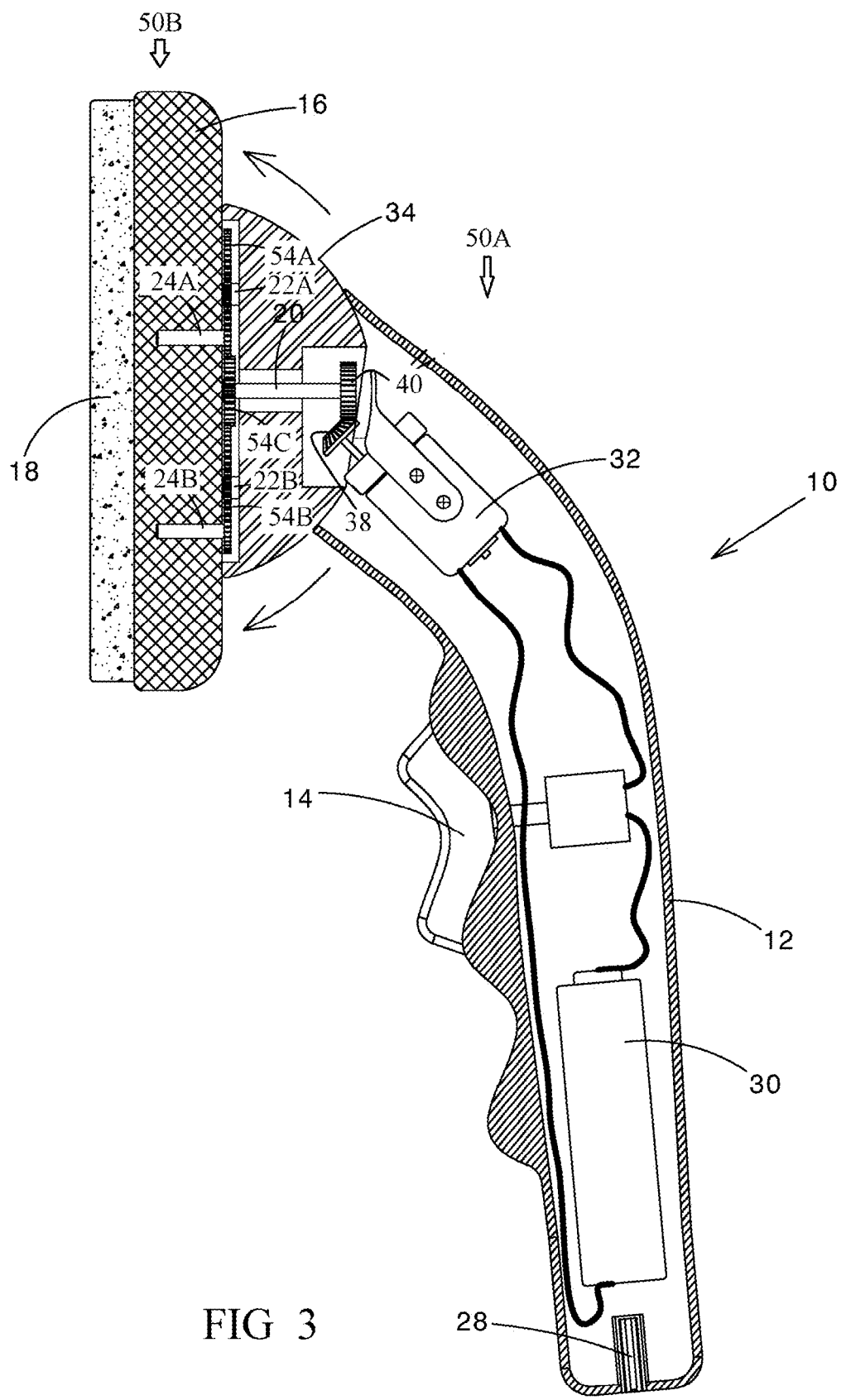
FIG. 3 is a sectional view of the motorized and brushing members of FIG. 1.

FIG. 3 is a sectional view of the motorized and brushing members of FIG. 1.

A motor 32 rotates a central gear 54C.

Referring again to FIG. 2, equal gears 54A and 54B are interlaced with central gear 54C, one opposite to the other, thus they rotate at equal speeds.

The interlacing of gears 54A and 54B to central gear 54C disposes pins 24A and 24B at the same side.

FIG. 4 is a top view of the opposing gears at the state of FIG. 3.

Pins 24A and 24B are shown disposed at the left, enumerated 64A.

FIG. 5 is the top view of the opposing gears upon rotating 90 degrees.

Since gears 54A and 54B are equal, and pins 24A and 24B are equally distanced 58, once pin 24A is disposed up enumerated 64B, pin 24B as well is disposed up, and the virtual line 60 therebetween maintains its angle, to the angle of the state of FIG. 5, being horizontal according to the examples.

FIG. 6 depicts 4 locations of one of the pins of FIG. 2, and the disposition of the brush member for each of the dispositions.

Pins 24A and 24B extend from gears 54A and 54B respectively, and having the equal distances 58 between center 20 and center 22A and 22B of the gears.

In case pin 24A is disposed at location 64A, brush 18 is disposed at zone 62A; in case pin 24A is disposed at location 64B, brush 18 is disposed at zone 62B; in case pin 24A is disposed at location 64C, brush 18 is disposed at zone 62C; and in case pin 24A is disposed at location 64D, brush 18 is disposed at zone 62D.

Zone 62A is left to zone 62C, thus providing a left to right back and forth motion to brush 18; zone 62B is above zone 62D, thus providing a top to bottom back and forth motion to brush 18; and zone 62A is below and left to zone 62B, thus providing a 45 degrees back and forth motion to brush 18. Considering the states between these 4 shown states, brush 18 moves back and forth in all directions.

This brushing movement is further advantaged in applying equal distances and speeds to all points of the user's body, being in contrast to symmetric rotating of a brush, or even to eccentric rotating of a brush applying a higher distance and speed away from the center of the rotation.

Figure 7:
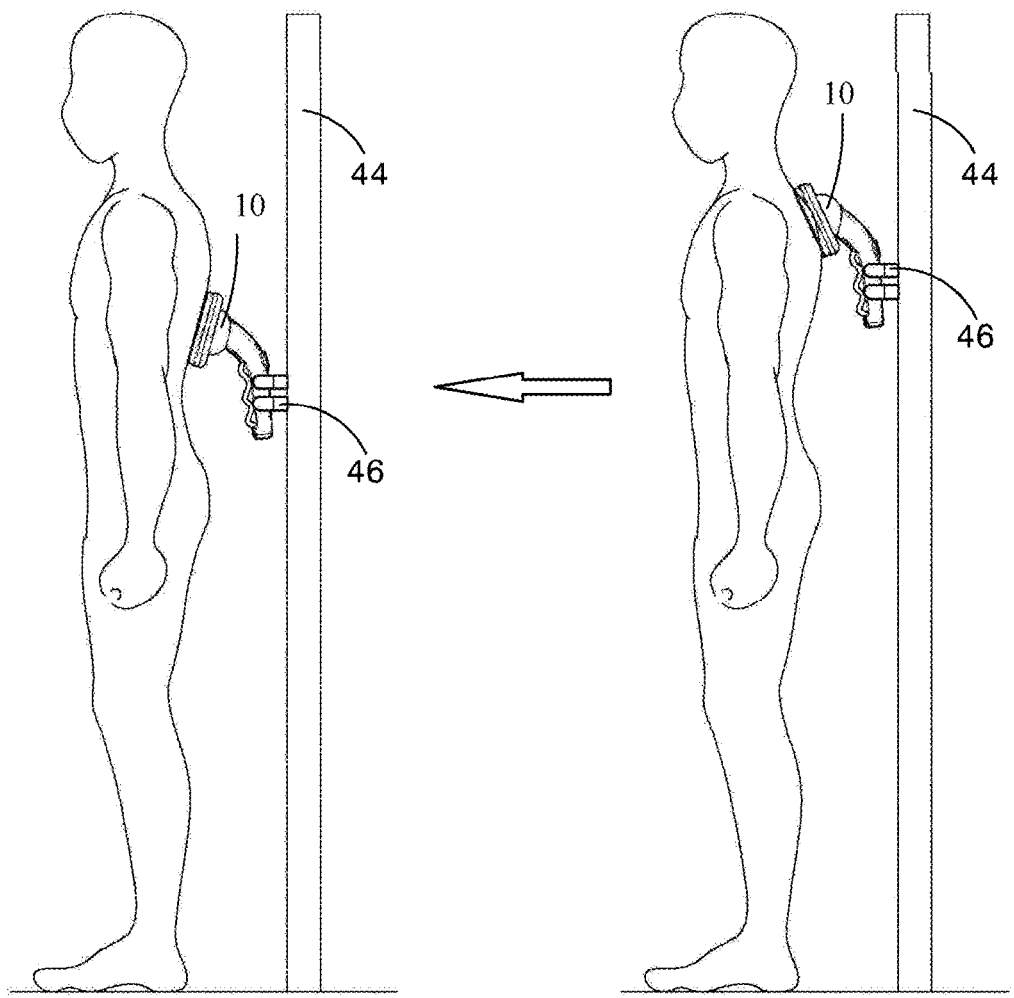
FIG. 7 is a side view of the brushing accessory of FIG. 1 including an elevator.

FIG. 7 is a side view of the brushing accessory of FIG. 1 including an elevator.

Brushing accessory 10 may include an elevator 44, for brushing various heights.

Figure 8:
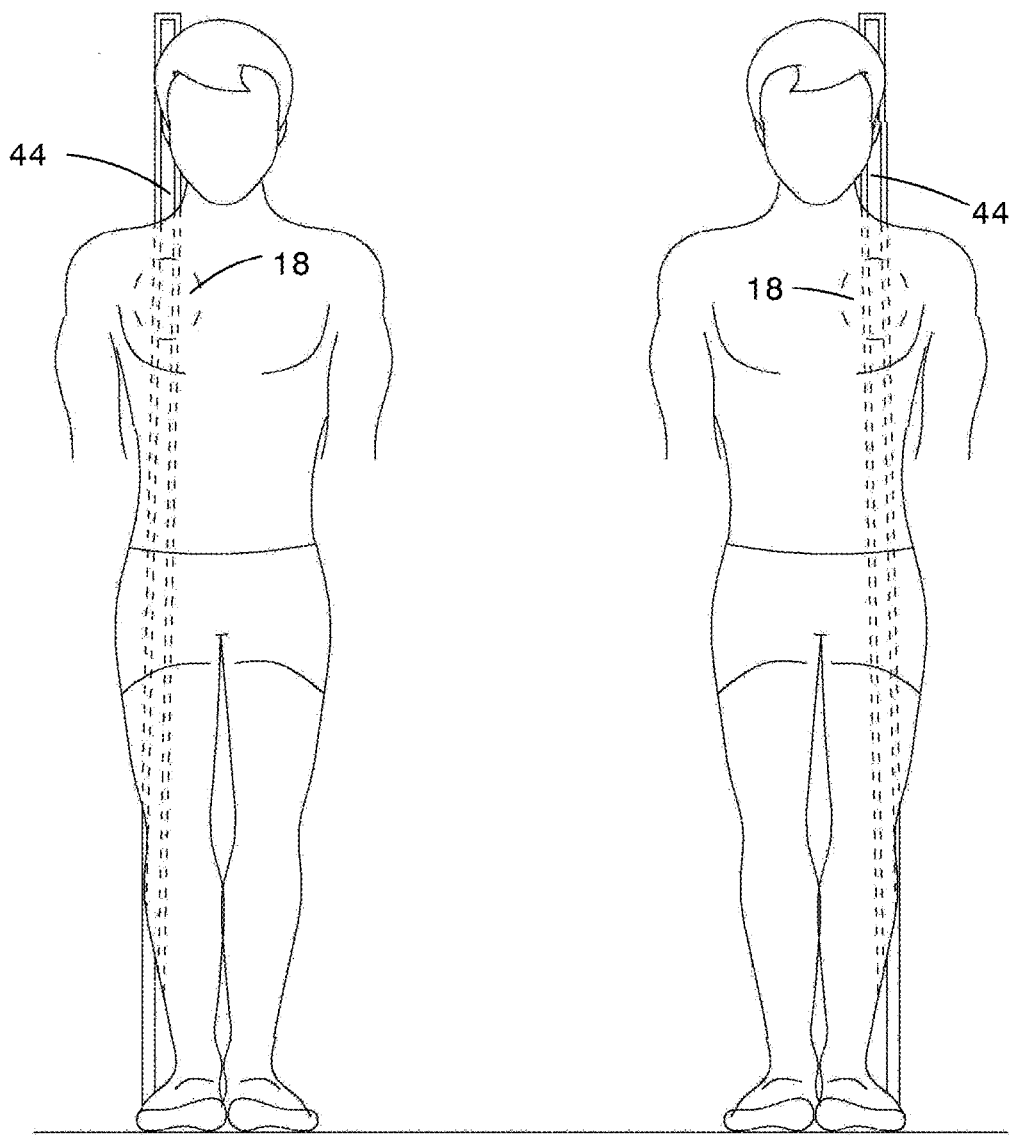
FIG. 8 is a front view of the brushing accessory of FIG. 7.

FIG. 8 is a front view of the brushing accessory of FIG. 7.

The user may move left and right in relation to the elevator of FIG. 7.

Figure 9:
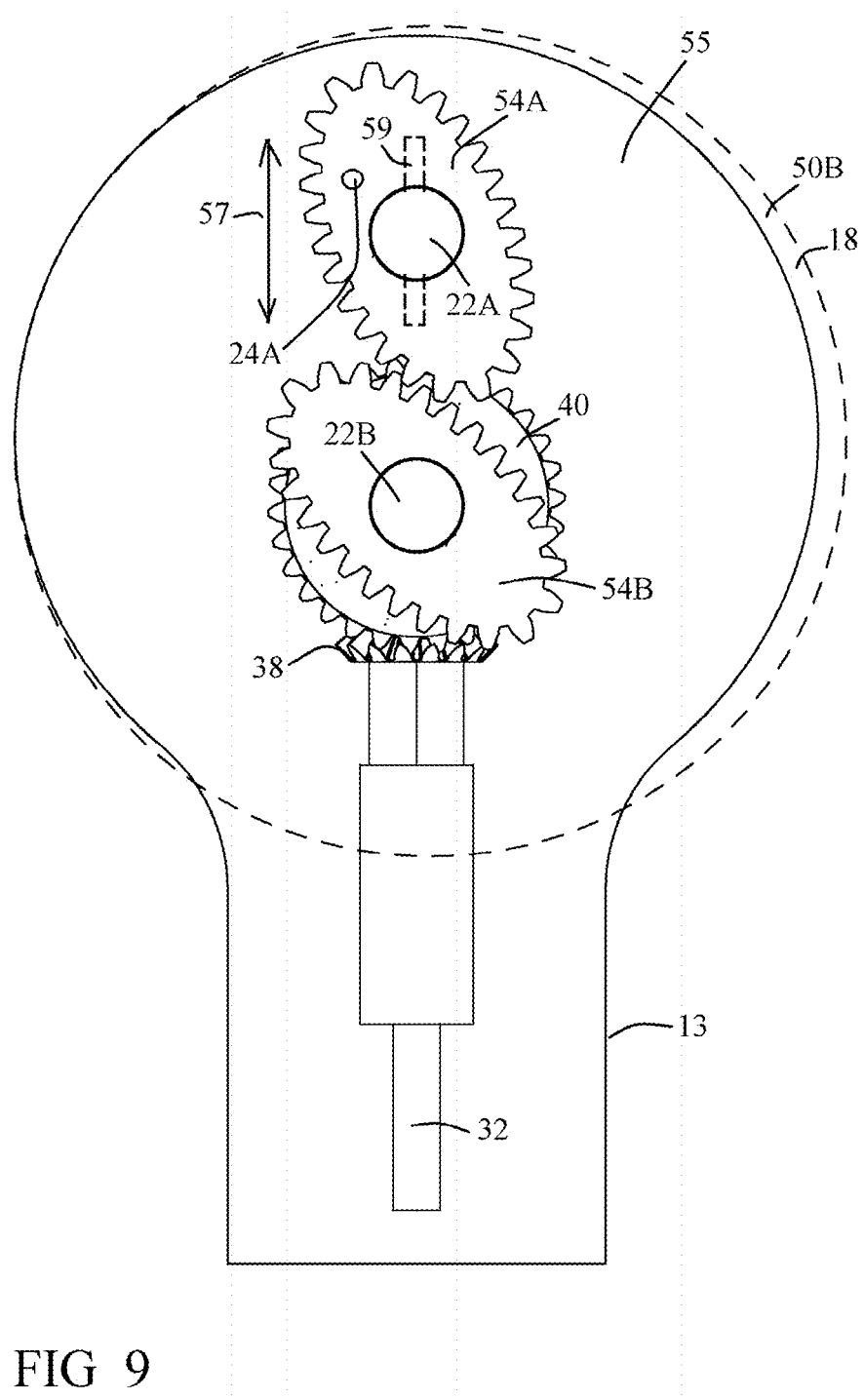
FIG. 9 is a top view of a brushing accessory according to another embodiment of the invention at a first position.

FIG. 9 is a top view of a brushing accessory according to another embodiment of the invention at a first position.

Gears 54A and 54B are elliptic, and are interlaced with one another. Motor 32 rotates gear 38, being interlaced with gear 40. Gear 40 is fixed to elliptic gear 54B for rotating it.

Thus motor 32 rotates elliptic gear 54B, being interlaced with elliptic gear 54A.

Hinge 22B of gear 54B is fixed to stationary plate 55 (shown in FIG. 2), whereas hinge 22A of gear 54A is slidable 57 within a rail 59 fixed to plate 55.

Pin 24A extends from gear 54A into hole 26A of brushing member 50B of FIG. 1 having brush 18.

Figure 10:
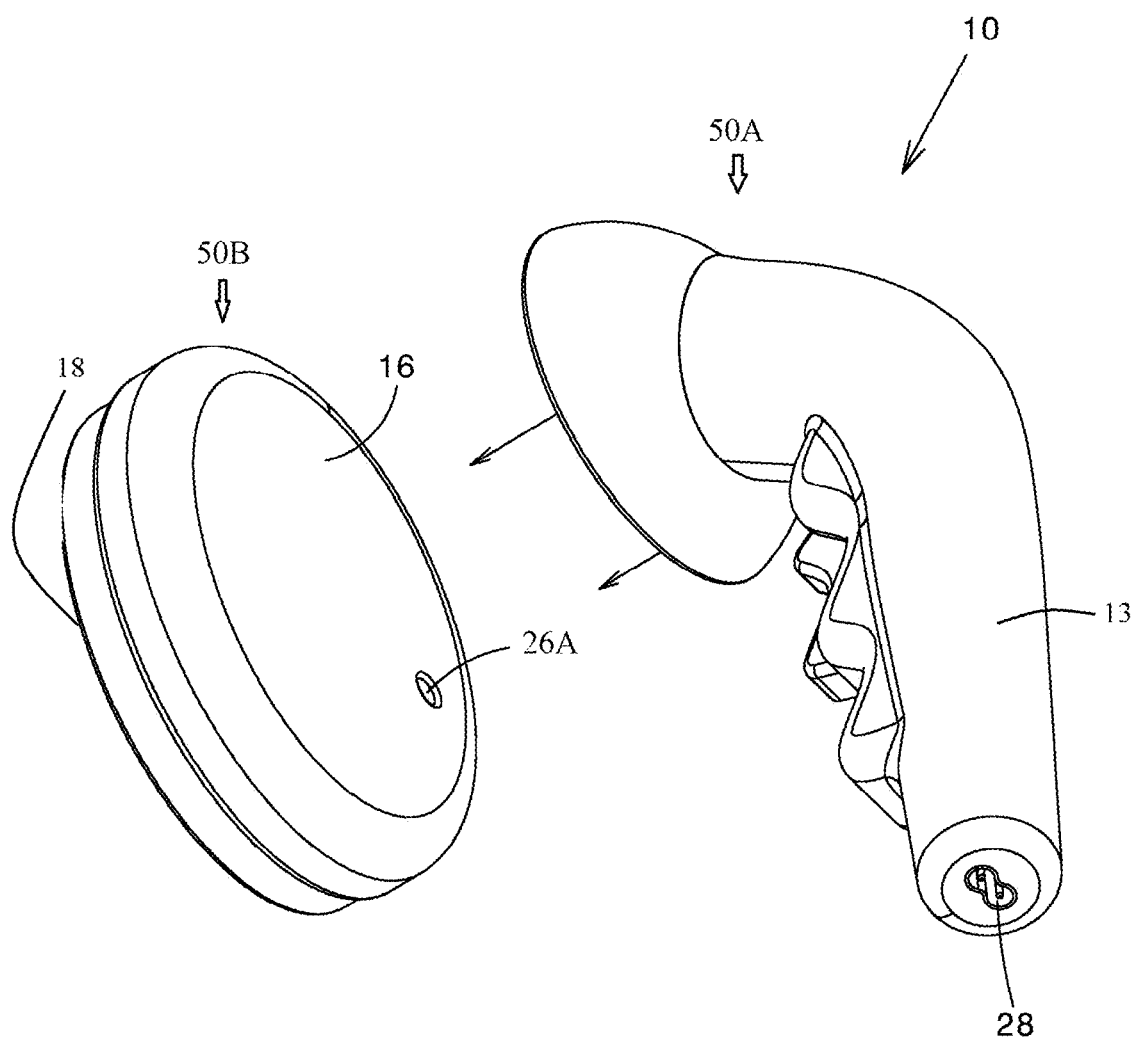
FIG. 10 is the exploded perspective view for the embodiment of FIG. 9.

FIG. 10 is the exploded perspective view for the embodiment of FIG. 9.

Brushing accessory 10 includes motorized member 50A and brushing member 50B, including hole 26A at a first side and a brush 18 at its second side.

Figure 11:
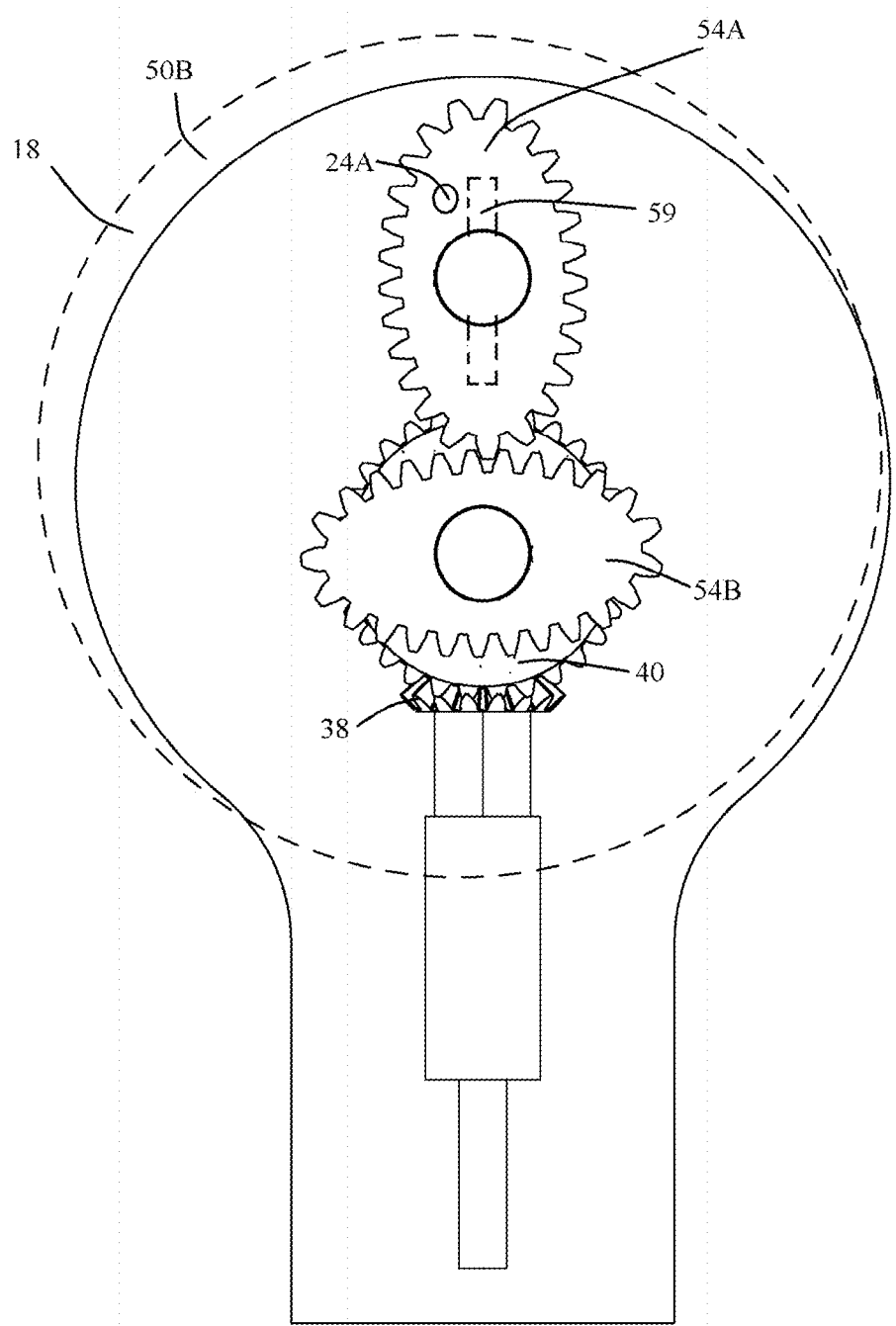
FIG. 11 is a top view of the brushing accessory of FIG. 9 at a second position of the elliptic gears.

FIG. 11 is a top view of the brushing accessory of FIG. 9 at a second position of the elliptic gears.

Gears 54A and 54B are interlaced with one another even though they are elliptic as shown by the two different positions of gears 54A and 54B of FIG. 9 and of FIG. 10.

Figure 12:
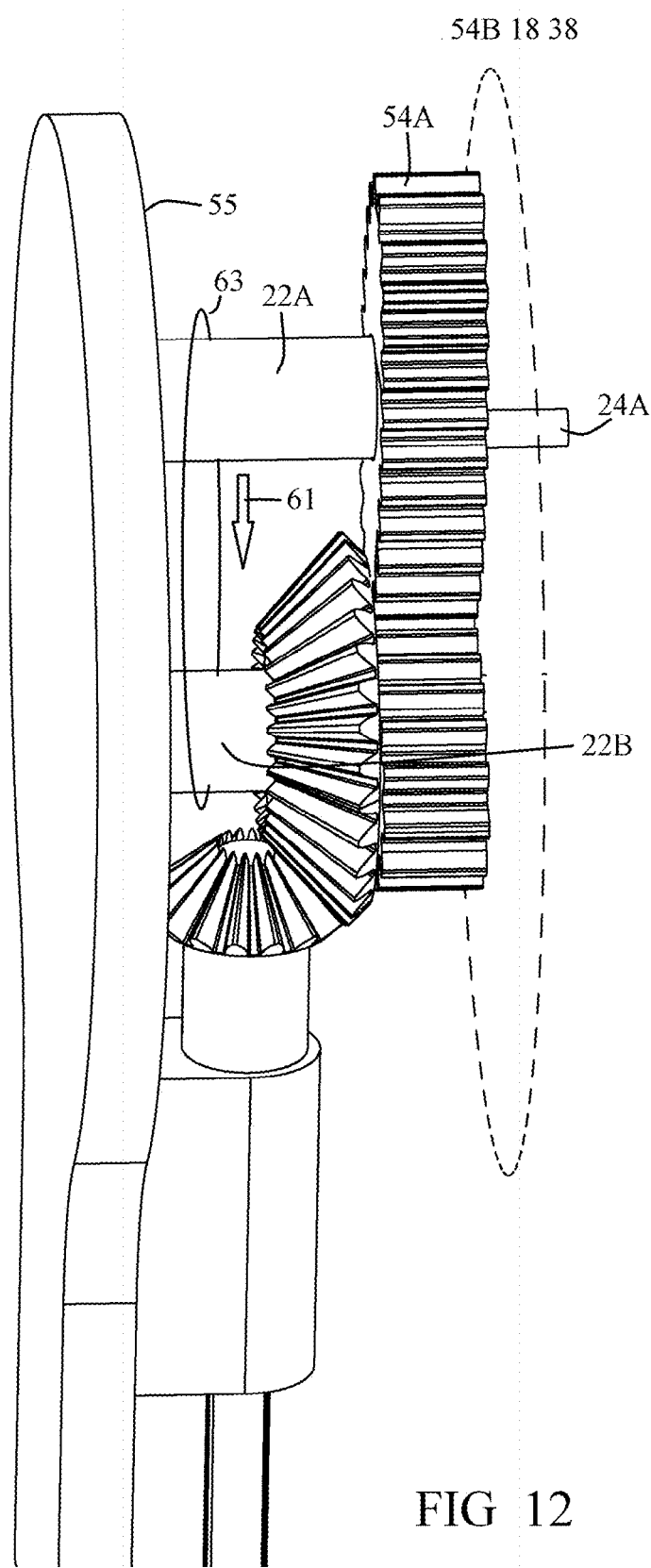
FIG. 12 is a perspective view showing the produced motion of the brush.

FIG. 12 is a perspective view showing the produced motion of the brush.

An elastic band or other springy element 63 draws (61) hinge 22A towards hinge 22B for ensuring the interlacing of elliptic gear 54A with elliptic gear 54B, in spite of the sliding therebetween Thus, in one aspect, the invention is directed to a brushing accessory (10), including:
   a brushing member (50B), including a brush (18); and
   a motorized member (50A), including a motor (32) including a first gear (54C), and including a second gear (54A) interlaced with the first gear (54C),
wherein the diameter of the second gear (54A) is of several centimeters,
   thereby the second gear (54A) moves the brush (18) several centimeters at least back and forth.
The brushing accessory (10) may further include:
   a third gear (54B) interlaced with the first gear (54C),
   thereby the back and forth moving of the brush is along all directions.
   Centers of (22A,22B,20) of the first, second and third gears may be disposed along a virtual line (60).
   The second (54A) and third (54B) gears may be equal.
   The brush (18) may be connected to a point (24A) of the second gear (54A) and to a point (24B) of the third gear (54B),
   and the points (24A,24B) may be equally distanced (58) each from the center (22A) of that gear.
   The interlacing of the second (54A) and third (54B) gears may dispose the points (24A,24B) at an equal side.
In another aspect, the invention is directed to a brushing accessory (10), including:
   a first member (50B), including a hole (26A) and a brush (18) fixed thereto; and
   a second member (50A), including
      a) a motor (32) for rotating a first elliptic gear (54B);
      b) a second elliptic gear (54A) interlaced with the first elliptic gear (54B); and
      c) a pin (24A) extending from the second elliptic gear (54A) into the hole (26A) of the first member (50B),
   thereby moving the brush (18) on a user's body as a function of changing locations of the pin (24A), the locations changing as a function of the interlacing of the elliptic gears.

The brushing accessory (10) may further include:
   a rail (59) for allowing sliding a hinge (22A) of the second elliptic gear (54A).
The brushing accessory (10) may further include:
   a springy element (63) for drawing the second elliptic gear (54A) towards the first elliptic gear (54B), for interlacing therebetween.

In the figures and/or description herein, the following reference numerals (Reference Signs List) have been mentioned:
   numeral 10 denotes the brushing accessory according to one embodiment of the invention;
   12: package;
   13: handle;
   14: operating button;
   16: head of brush;
   18: brush, sponge, etc.;
   20: center and hinge of gear 54C;
   22A: center and hinge of gear 54A;
   22B: center and hinge of gear 54B;
   24A,24B: pins or depressions of motorized member 50A, for transferring motion;
   26A,26B: pins or depressions of brushing member 50B, for receiving motion from points 24A,24B respectively;
   28: electric socket;
   30: battery;
   32: motor;
   34: joint allowing rotating thereof in relation to package 12;
   38,40: gears;
   44: elevator;
   46: rack;
   50A: motorized member;
   50B: brushing member;
   54A,54B,54C: gears;
   55: stationary plate;
   58: distances between center 20 and centers 22A and 22B of gears;
   60: virtual line;
   62A,62B,62C,62D: temporal zone of brush 18;
   64A,64B,64C,64D: temporal location of pin 24A;

The foregoing description and illustrations of the embodiments of the invention have been presented for the purpose of illustration, and are not intended to be exhaustive or to limit the invention to the above description in any form.

Any term that has been defined above and used in the claims, should to be interpreted according to\this definition.

The reference numbers in the claims are not a part of the claims, but rather used for facilitating the reading thereof. These reference numbers should not be interpreted as limiting the claims in any form.

What is claimed is:

1. A brushing accessory, comprising:
   a first member, comprising a hole and a brush fixed thereto; and
   a second member, comprising
      a) a motor for rotating a first elliptic gear;
      b) a second elliptic gear interlaced with said first elliptic gear; and
      c) a pin extending from said second elliptic gear into said hole of said first member,
   thereby moving said brush on a user's body as a function of changing locations of said pin, said locations changing as a function of said interlacing of said elliptic gears.

2. The brushing accessory according to claim 1, further comprising:
   a rail (59) for allowing sliding a hinge of said second elliptic gear.

3. The brushing accessory according to claim 2, further comprising:
   a springy element for drawing said second elliptic gear towards said first elliptic gear, for interlacing therebetween.

* * * * *